United States Patent
Jung et al.

(10) Patent No.: US 9,401,831 B2
(45) Date of Patent: Jul. 26, 2016

(54) APPARATUS AND METHOD FOR REMOVING DC OFFSET IN WIRELESS COMMUNICATION SYSTEM

(75) Inventors: Hyun-Jung Jung, Suwon-si (KR); Young-Il Son, Hwaseong-si (KR); Hye-Won Nam, Seoul (KR); Yong-Won Shin, Suwon-si (KR); In-Chun Lim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 429 days.

(21) Appl. No.: 12/908,246

(22) Filed: Oct. 20, 2010

(65) Prior Publication Data

US 2011/0090989 A1    Apr. 21, 2011

(30) Foreign Application Priority Data

Oct. 20, 2009    (KR) .................. 10-2009-0099568

(51) Int. Cl.
*H04L 25/06* (2006.01)

(52) U.S. Cl.
CPC .................................... *H04L 25/062* (2013.01)

(58) Field of Classification Search
CPC ..... H04L 25/06; H04L 25/061; H04L 25/062; H04L 1/0041; H04L 1/0045; H04L 1/0071; H04L 5/06; H04B 1/30
USPC ......... 375/130, 260, 285, 318, 319, 340, 345, 375/346; 455/114.2, 126, 295, 310, 312, 455/314

See application file for complete search history.

(56) References Cited

U.S. PATENT DOCUMENTS

| | | | | |
|---|---|---|---|---|
| 7,221,918 | B1* | 5/2007 | Grasbeck ................ | H04B 1/30 375/148 |
| 2004/0063417 | A1* | 4/2004 | Binshtok et al. .............. | 455/314 |
| 2004/0202102 | A1* | 10/2004 | Kim et al. ..................... | 370/208 |
| 2005/0058105 | A1* | 3/2005 | Yu ................................ | 370/335 |
| 2005/0062513 | A1* | 3/2005 | Sim .............................. | 327/307 |
| 2007/0058738 | A1* | 3/2007 | Mahadevappa ........ | H04B 1/715 375/260 |
| 2007/0298733 | A1* | 12/2007 | Cole et al. .................. | 455/114.2 |
| 2009/0310690 | A1* | 12/2009 | Lee .............................. | 375/260 |
| 2010/0128819 | A1 | 5/2010 | Lee et al. | |
| 2010/0316175 | A1* | 12/2010 | Zeng ...................... | H04L 7/042 375/360 |

FOREIGN PATENT DOCUMENTS

KR    10-2005-0028149 A    3/2005
KR       10-0638592 B1    10/2006

* cited by examiner

*Primary Examiner* — Syed Haider
(74) *Attorney, Agent, or Firm* — Jefferson IP Law, LLP (57) ABSTRACT

An apparatus and method for removing a Direct Current (DC) offset at a receiving terminal in a wireless communication system are provided. In the method, a frame is divided into at least two time resource blocks. Resource allocation information is used to discriminate between at least one time resource block of a data-unmapped interval and at least one time resource block of a data-mapped interval. The DC offset is measured during the data-unmapped interval. The DC offset is compensated during the data-unmapped interval on a time resource block basis by using the measured DC offset.

14 Claims, 5 Drawing Sheets

APPARATUS AND METHOD FOR REMOVING DC OFFSET IN WIRELESS COMMUNICATION SYSTEM

PRIORITY

This application claims the benefit under 35 U.S.C. §119 (a) of a Korean patent application filed in the Korean Intellectual Property Office on Oct. 20, 2009 and assigned Serial No. 10-2009-0099568, the entire disclosure of which is incorporated herein by reference.

BACKGROUND OF THE INVENTION

1. Field of the Invention

The present invention relates to a receiving terminal in a wireless communication system. More particularly, the present invention relates to an apparatus and method for removing a Direct Current (DC) offset at a receiving terminal in a wireless communication system.

2. Description of the Related Art

In a wireless communication system, a Radio Frequency (RF) receiver of a receiving terminal down-converts a signal received through an antenna and amplifies the received signal. The RF receiver includes analog elements such as a filter, a mixer and an amplifier. Accordingly, the receiving terminal undergoes a signal distortion due to the imperfection and isolation of the analog elements constituting the RF receiver. For example, the receiving terminal undergoes a signal distortion due to a DC offset.

The DC offset degrades the digital demodulation performance of the receiving terminal, thus degrading the Signal-to-Noise Ratio (SNR) of the receiving system. Accordingly, the receiving terminal must remove the DC offset. For example, the receiving terminal may remove the DC offset by applying the measured DC offset of the $i^{th}$ frame to the $(i+1)^{th}$ frame, as illustrated in FIG. 1.

Figure 1:
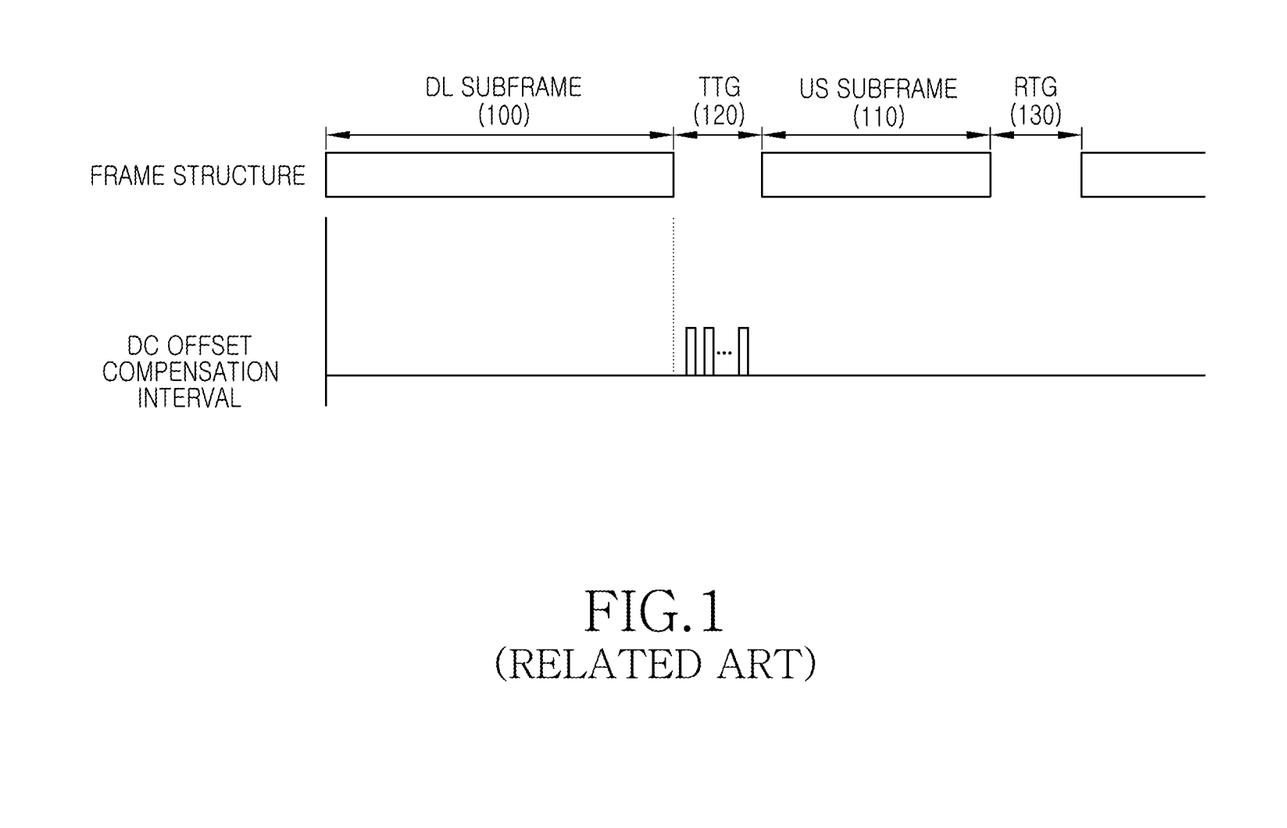
FIG. 1 is a diagram illustrating a DC offset compensation interval at a receiving terminal in a wireless communication system according to the related art.

FIG. 1 is a diagram illustrating a DC offset compensation interval at a receiving terminal in a wireless communication system according to the related art.

Referring to FIG. 1, the receiving terminal measures the average value of the DC offset of the $i^{th}$ frame during a downlink (DL) subframe 100. Thereafter, the receiving terminal may remove the DC offset of the $(i+1)^{th}$ frame by compensating the DC offset during a Transmit/receive Transition Gap (TTG) 120 by using the measured DC offset value.

As described above, if the receiving terminal compensates the DC offset on a frame basis, the frame for DC offset estimation and the frame for DC offset compensation must have a similar DC offset. That is, if an inter-frame DC offset change is significant, the receiving terminal may fail to remove the DC offset due to an inaccurate estimate of the DC offset of a DC offset compensation frame according to the inter-frame DC offset change.

SUMMARY OF THE INVENTION

An aspect of the present invention is to address at least the above-mentioned problems and/or disadvantages and to provide at least the advantages below. Accordingly, an aspect of the present invention is to provide an apparatus and method for removing a DC offset at a receiving terminal in a wireless communication system.

Another aspect of the present invention is to provide an apparatus and method for removing a DC offset at a receiving terminal in a wireless communication system by using data-unmapped downlink time resources.

Another aspect of the present invention is to provide an apparatus and method for removing a DC offset at a receiving terminal in a wireless communication system on a symbol basis.

Another aspect of the present invention is to provide an apparatus and method for removing a DC offset at a receiving terminal in a wireless communication system by using a High-Pass Filter (HPF) selectively according to the strength of a received signal.

In accordance with an aspect of the present invention, a method for compensating a DC offset at a receiving terminal in a wireless communication system is provided. The method includes dividing a frame into at least two time resource blocks, classifying at least one time resource block of a data-unmapped interval and at least one time resource block of a data-mapped interval using resource allocation information, measuring the DC offset during the data-unmapped interval, and compensating the DC offset on a time resource block basis by using the measured DC offset during the data-unmapped interval.

In accordance with another aspect of the present invention, an apparatus of a receiving terminal for compensating a DC offset in a wireless communication system is provided. The apparatus includes an Analog-to-Digital Converter (ADC) for converting received signals into digital signals, a Low-Pass Filter (LPF) for passing only signals lower than a reference frequency band, among the digital signals received from the ADC, a power determiner for determining the power of a signal passing the LPF, a DC offset measurer for measuring the DC offset during a data-unmapped interval by using the power value determined by the power determiner, a DC offset compensation controller for dividing a frame into at least two time resource blocks, for classifying at least one time resource block of the data-unmapped interval and at least one time resource block of a data-mapped interval using resource allocation information, for measuring the DC offset, and for performing a control operation to compensate the DC offset on a time resource block basis, and a Serial Peripheral Interface (SPI) for transmitting a control signal to a Radio Frequency Integrated Circuit (RFIC) to compensate the RFIC by the DC offset measured by the DC offset measurer, during the data unmapped interval, under the control of the DC offset compensation controller.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide The present invention provides a scheme for removing a DC offset at a receiving terminal in a wireless communication system.

In the following description, it is assumed that the wireless communication system uses a Time Division Duplexing (TDD) scheme.

Furthermore, in the following description, the receiving terminal divides a frame into time resource blocks and removes a DC offset on a time resource block basis. Herein, the time resource block includes symbols and subframes. In the following description, it is assumed that the receiving terminal removes a DC offset on a symbol basis.

In order to remove a DC offset according to a DC offset change, the receiving terminal of the wireless communication system removes a DC offset of a Radio Frequency Integrated Circuit (RFIC) by compensating a DC offset during a data-unmapped symbol interval. Herein, the data-unmapped symbol interval includes a Transmit/receive Transition Gap (TTG) and a Receive/transmit Transition Gap (RTG).

Figure 2:
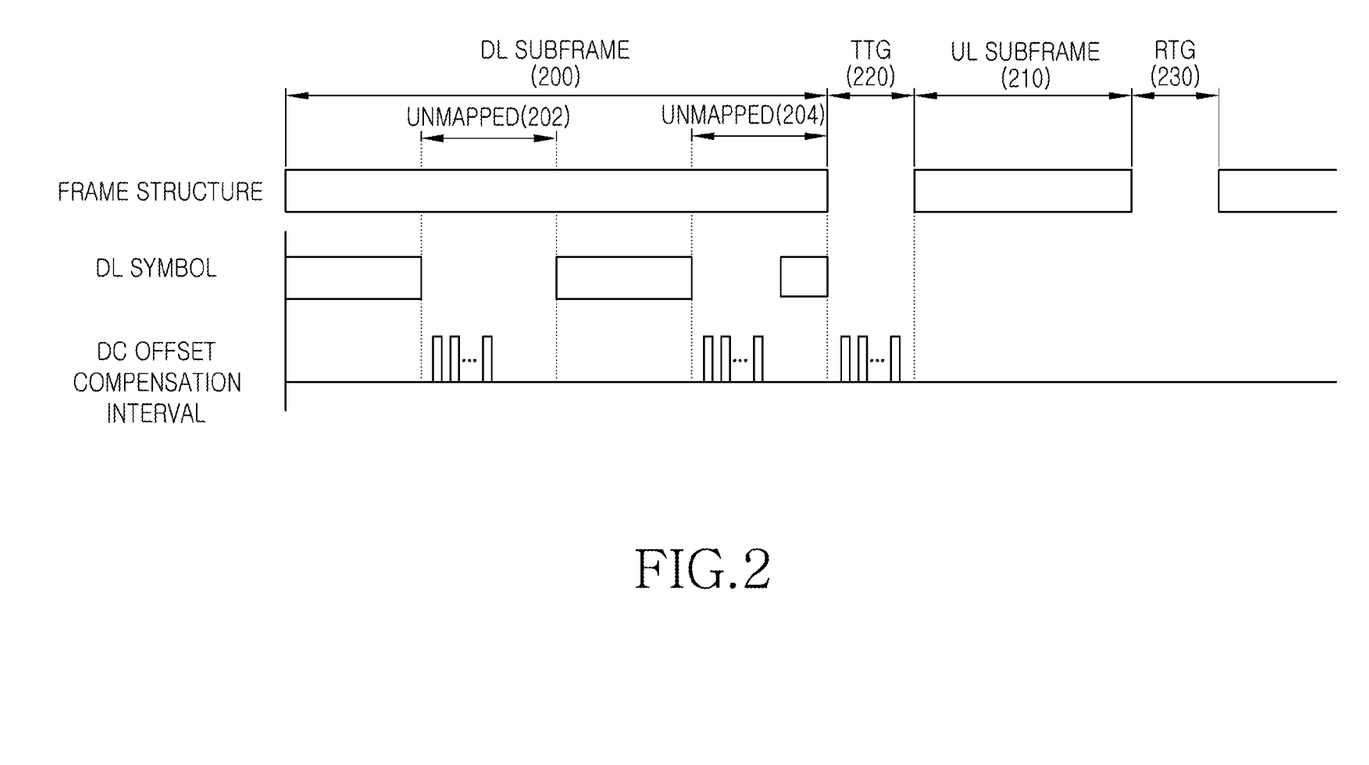
FIG. 2 is a diagram illustrating a DC offset compensation interval at a receiving terminal in a wireless communication system according to an exemplary embodiment of the present invention.

FIG. 2 is a diagram illustrating a DC offset compensation interval at a receiving terminal in a wireless communication system according to an exemplary embodiment of the present invention.

Referring to FIG. 2, a frame of a TDD wireless communication system includes a downlink (DL) subframe 200 and an uplink (UL) subframe 210. Herein, a Transmit/receive Transition Gap (TTG) 220 (i.e., a guard time interval) is present between the DL subframe 200 and the UL subframe 210. Also, a Receive/transmit Transition Gap (RTG) 230 (i.e., a guard time interval) is present between the $i^{th}$ frame and the $(i+1)^{th}$ frame.

The receiving terminal receives DL data from a transmitting terminal during the DL subframe 200. However, if there are data-unmapped symbol intervals 202 and 204 during the DL subframe 200, the receiving terminal does not receive data during the data-unmapped symbol intervals 202 and 204. Accordingly, the receiving terminal can compensate a DC offset during the data-unmapped symbol intervals 202 and 204. For example, the receiving terminal compensates the DC offset by measuring the average of the DC offset during the data-unmapped symbol intervals 202 and 204. Herein, the average of the DC offset is the average of DC offsets determined through data-mapped symbols before the data-unmapped symbol interval 202.

Figure 3:
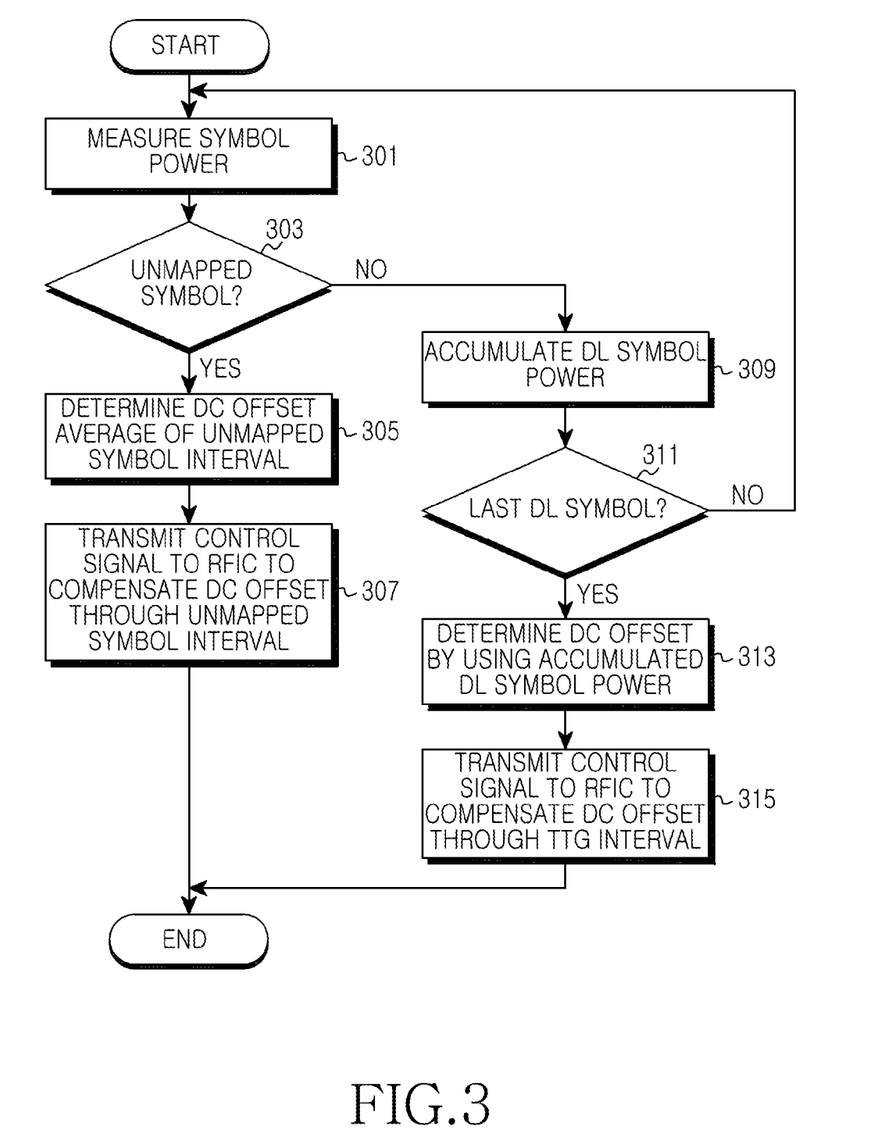
FIG. 3 is a flow diagram illustrating a process for removing a DC offset at a receiving terminal according to an exemplary embodiment of the present invention.

As described above, the receiving terminal compensates the DC offset during the data-unmapped symbol interval. In order to compensate the DC offset, the receiving terminal may operate as illustrated in FIG. 3. In the following description, it is assumed that the receiving terminal divides a frame on a symbol basis through resource allocation information received from the transmitting terminal and can discriminate between a data-mapped symbol interval and a data-unmapped symbol interval.

FIG. 3 is a flow diagram illustrating a process for removing a DC offset at a receiving terminal according to an exemplary embodiment of the present invention.

Referring to FIG. 3, the receiving terminal measures the power of a received signal in step 301.

In step 303, the receiving terminal determines whether the symbol interval of the received signal is a data-unmapped symbol interval.

If it is determined in step 303 that the symbol interval of the received signal is a data-unmapped symbol interval, the receiving terminal proceeds to step 305. In step 305, the receiving terminal determines the average of the DC offset during the data-unmapped symbol interval. For example, the receiving terminal determines the average of the DC offset of data-mapped symbols before the data-unmapped symbol interval. Herein, the receiving terminal may determine the DC offset by using the power information of the received signal accumulated through signals received through a data-mapped symbol, during the data-unmapped symbol interval.

In step 307, the receiving terminal compensates the DC offset of each symbol by using the determined DC offset average, during the data-unmapped symbol interval. For example, the receiving terminal performs a DC offset compensation algorithm on each symbol by using the DC offset average determined in step 305. That is, if compensating the DC offset caused by an analog amplifier, the receiving terminal determines the compensation value for compensation of the DC offset of the analog amplifier.

Thereafter, the receiving terminal controls an RFIC to compensate the DC offset through a Serial Peripheral Interface (SPI) according to the result of the DC offset compensation algorithm. Herein, the receiving terminal may determine the DC offset of each symbol by using the received signal power measured in step 301.

On the other hand, if it is determined in step 303 that the symbol interval of the received signal is a data-mapped symbol interval, the receiving terminal proceeds to step 309. In step 309, the receiving terminal stores the received signal power measured in step 301. If the power information of the received signal is prestored, the receiving terminal accumulates the received signal power measured in step 301 with the received signal power information prestored. That is, the receiving terminal accumulates the received signal power of data-mapped symbols.

In step 311, the receiving terminal determines whether the symbol of the received signal in step 301 is the last symbol of a DL subframe.

If it is determined in step 311 that the symbol of the received signal is not the last symbol of a DL subframe, the receiving terminal returns to step 301. In step 301, the receiving terminal measures the power of a signal received through the next symbol.

On the other hand, if it is determined in step 311 that the symbol of the received signal is the last symbol of a DL subframe, the receiving terminal proceeds to step 313. In step 313, the receiving terminal determines the DC offset value by using the accumulated received signal power information. For example, if the symbol of the received signal is the last symbol of the DL subframe, the next symbol is included in a TTG and is a data-unmapped symbol. Accordingly, the receiving terminal determines the DC offset value by using the accumulated received signal power information to compensate the DC offset during the data-unmapped symbol.

In step 315, the receiving terminal compensates the DC offset of each symbol by using the DC offset value determined in step 313. For example, the receiving terminal compensates the DC offset of each symbol during a TTG interval by using the DC offset value determined in step 313. Herein, the receiving terminal performs a DC offset compensation algorithm on each symbol by using the DC offset average determined in step 313. Thereafter, the receiving terminal controls the RFIC to compensate the DC offset through the SPI according to the result of the DC offset compensation algorithm. As another example, the receiving terminal may compensate the DC offset of each symbol during an RTG interval by using the DC offset value determined in step 313.

Thereafter, the receiving terminal ends the DC offset compensation process for the $i^{th}$ frame.

If receiving a signal through an antenna, the receiving terminal amplifies the received signal through an RF receiver. At this point, the DC offset of the received signal is simultaneously amplified. Accordingly, if the signal received through the antenna is small, the amplification factor of the RF receiver increases and thus the DC offset of the received signal may increase.

Figure 4:
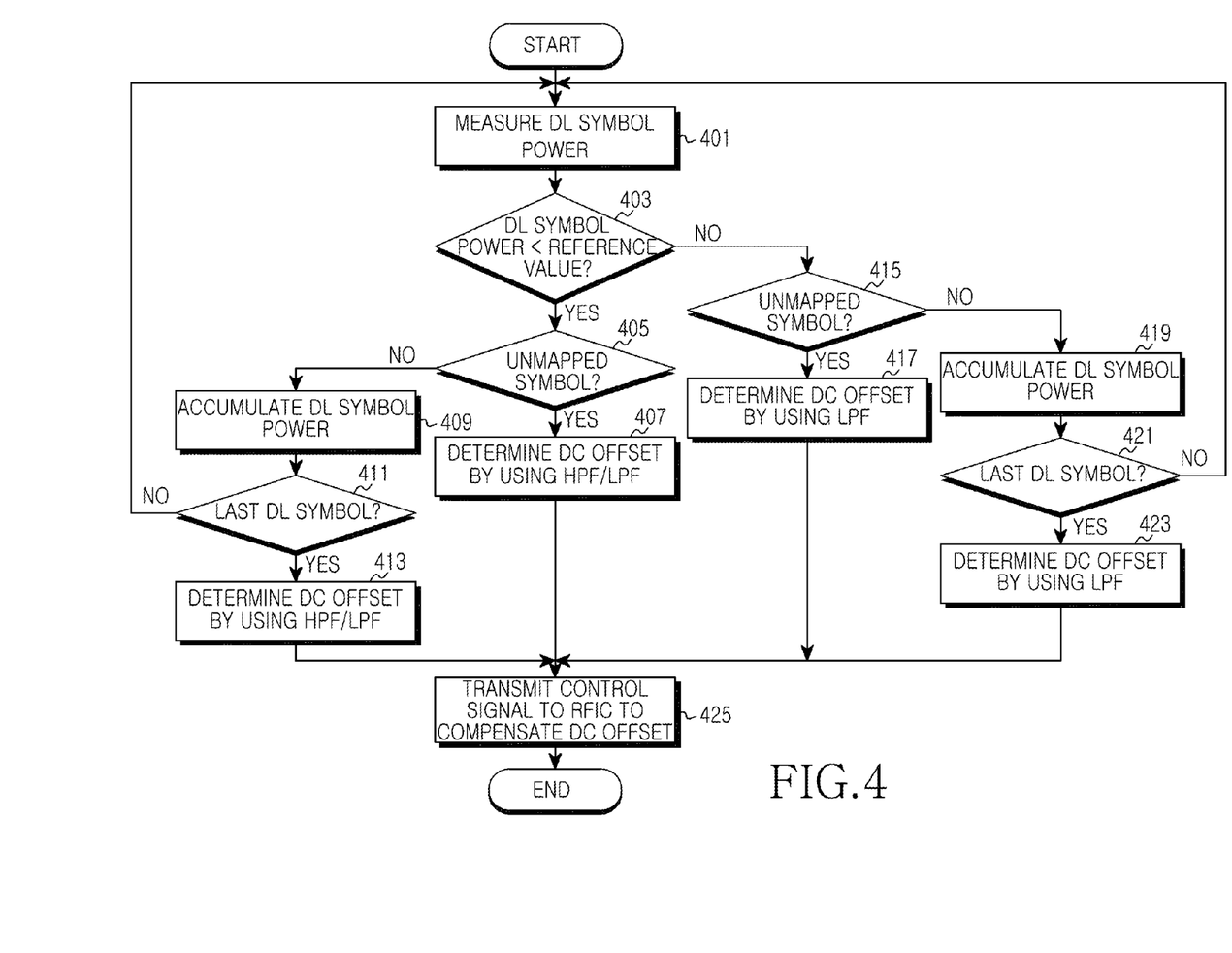
FIG. 4 is a flow diagram illustrating a process for removing a DC offset at a receiving terminal in consideration of the strength of a received signal according to an exemplary embodiment of the present invention.

If the DC offset increases, the receiving terminal may use a High-Pass Filter (HPF) to compensate the DC offset as illustrated in FIG. 4.

FIG. 4 is a flow diagram illustrating a process for removing a DC offset at a receiving terminal in consideration of the strength of a received signal according to an exemplary embodiment of the present invention.

Referring to FIG. 4, the receiving terminal measures the power of a received signal in step 401.

In step 403, the receiving terminal determines whether the measured received signal power is smaller than a reference power. That is, the receiving terminal determines whether the received signal power measured in step 401 has a high gain.

If it is determined in step 403 that the measured received signal power is smaller than the reference power, the receiving terminal recognizes that the received signal has a high gain. Accordingly, in step 405, the receiving terminal determines whether the symbol interval of the received signal is a data-unmapped symbol interval.

If it is determined in step 405 that the symbol interval of the received signal is a data-unmapped symbol interval, the receiving terminal proceeds to step 407. In step 407, the receiving terminal determines a DC offset value during the data-unmapped symbol interval by using an HPF and a Low-Pass Filter (LPF). For example, the receiving terminal measures the DC offset value of a signal with a DC offset component removed through the HPF and the DC offset value of a signal passing through the LPF.

Thereafter, in step 425, the receiving terminal compensates the DC offset of each symbol during the data-unmapped symbol interval by using the DC offset value measured in step 407. For example, if the DC offset value of the signal passing through the HPF is smaller than a reference value, the receiving terminal recognizes that the DC offset of the RFIC can be compensated through the HPF. Accordingly, the receiving terminal removes the DC offset by using only the HPF. On the other hand, if the DC offset value of the signal passing through the HPF is greater than the reference value, the receiving terminal recognizes that the DC offset of the RFIC cannot be compensated through the HPF. Accordingly, the receiving terminal determines the difference between the DC offset value of the signal passing through the HPF and the DC offset value of the signal passing through the LPF. Thereafter, the receiving terminal compensates the DC offset of the RFIC by the determined DC offset difference. Herein, the receiving terminal controls the RFIC to compensate the DC offset by the determined DC offset difference.

On the other hand, if it is determined in step 405 that the symbol interval of the received signal is a data-mapped symbol interval, the receiving terminal proceeds to step 409. In step 409, the receiving terminal stores the received signal power measured in step 401. If the power information of the received signal is prestored, the receiving terminal accumulates the received signal power measured in step 401 with the received signal power information prestored. That is, the receiving terminal accumulates the received signal power of data-mapped symbols.

In step 411, the receiving terminal determines whether the symbol of the received signal in step 401 is the last symbol of a DL subframe.

If it is determined in step 411 that the symbol of the received signal is not the last symbol of a DL subframe, the receiving terminal returns to step 401. In step 401, the receiving terminal measures the power of a signal received through the next symbol.

On the other hand, if it is determined in step 411 that the symbol of the received signal is the last symbol of a DL subframe, the receiving terminal proceeds to step 413. In step 413, the receiving terminal determines the DC offset value of the HPF and the LPF by using the accumulated received signal power information. For example, if the symbol of the received signal is the last symbol of the DL subframe, the next symbol is included in a TTG and is a data-unmapped symbol. Accordingly, the receiving terminal determines the DC offset value by using the received signal power information accumulated to compensate the DC offset during the data-unmapped symbol.

Thereafter, in step 425, the receiving terminal compensates the DC offset of each symbol by using the DC offset value determined in step 413. For example, the receiving terminal compensates the DC offset of each symbol during a TTG interval by using the DC offset value determined in step 413. Herein, the receiving terminal measures the DC offset value of a signal passing through the HPF. If the DC offset value of the signal passing through the HPF is smaller than a reference value, the receiving terminal recognizes that the DC offset of the RFIC can be compensated through the HPF. In this case, the receiving terminal removes the DC offset by using only the HPF. On the other hand, if the DC offset value of the signal passing through the HPF is greater than the reference value, the receiving terminal recognizes that the DC offset of the RFIC cannot be compensated through the HPF. In this case, the receiving terminal determines the difference between the DC offset value of the signal passing through the HPF and the DC offset value of the signal passing through the LPF. Thereafter, the receiving terminal compensates the DC offset of the RFIC by the determined DC offset difference. Herein, the receiving terminal controls the RFIC to compensate the DC offset by the determined DC offset difference. As another example, the receiving terminal may compensate the DC offset of each symbol during the RTG interval by using the DC offset value determined in step 413.

If it is determined in step 403 that the measured received signal power is greater than the reference power, the receiving terminal recognizes that the received signal has a low gain. Accordingly, in step 415, the receiving terminal determines whether the symbol interval of the received signal is a data-unmapped symbol interval.

If it is determined in step 415 that the symbol interval of the received signal is a data-unmapped symbol interval, the receiving terminal proceeds to step 417. In step 417, the receiving terminal determines a DC offset value during the data-unmapped symbol interval by using an LPF. For example, the receiving terminal uses the LPF to determine the DC offset average of the data-mapped symbols before the data-unmapped symbol interval.

Thereafter, in step 425, the receiving terminal compensates the DC offset of each symbol during the data-unmapped symbol interval by using the DC offset value measured in step 417. For example, the receiving terminal performs a DC offset compensation algorithm on each symbol by using the DC offset average determined in step 417. That is, if compensating the DC offset caused by an analog amplifier, the receiving terminal determines the compensation value for compensation of the DC offset of the analog amplifier. Thereafter, the receiving terminal controls an RFIC to compensate the DC offset through an SPI according to the result of the DC offset compensation algorithm.

On the other hand, if it is determined in step 415 that the symbol interval of the received signal is a data-mapped symbol interval, the receiving terminal proceeds to step 419. In step 419, the receiving terminal stores the received signal power measured in step 401. If the power information of the received signal is prestored, the receiving terminal accumulates the received signal power measured in step 401 with the received signal power information prestored. That is, the receiving terminal accumulates the received signal power of data-mapped symbols.

In step 421, the receiving terminal determines whether the symbol of the received signal in step 401 is the last symbol of a DL subframe.

If it is determined in step 421 that the symbol of the received signal is not the last symbol of a DL subframe, the receiving terminal returns to step 401. In step 401, the receiving terminal measures the power of a signal received through the next symbol.

On the other hand, if it is determined in step 421 that the symbol of the received signal is the last symbol of a DL subframe, the receiving terminal proceeds to step 423. In step 423, the receiving terminal determines the DC offset value by using the accumulated received signal power information. For example, if the symbol of the received signal is the last symbol of the DL subframe, the next symbol is included in a TTG and is a data-unmapped symbol. Accordingly, the receiving terminal determines the DC offset value by using the received signal power information accumulated to compensate the DC offset during the data-unmapped symbol.

In step 425, the receiving terminal compensates the DC offset of each symbol by using the DC offset value determined in step 423. For example, the receiving terminal compensates the DC offset of each symbol during a TTG interval by using the DC offset value determined in step 423. As another example, the receiving terminal may compensate the DC offset of each symbol during an RTG interval by using the DC offset value determined in step 423.

Thereafter, the receiving terminal ends the DC offset compensation process for the $i^{th}$ frame.

Figure 5:
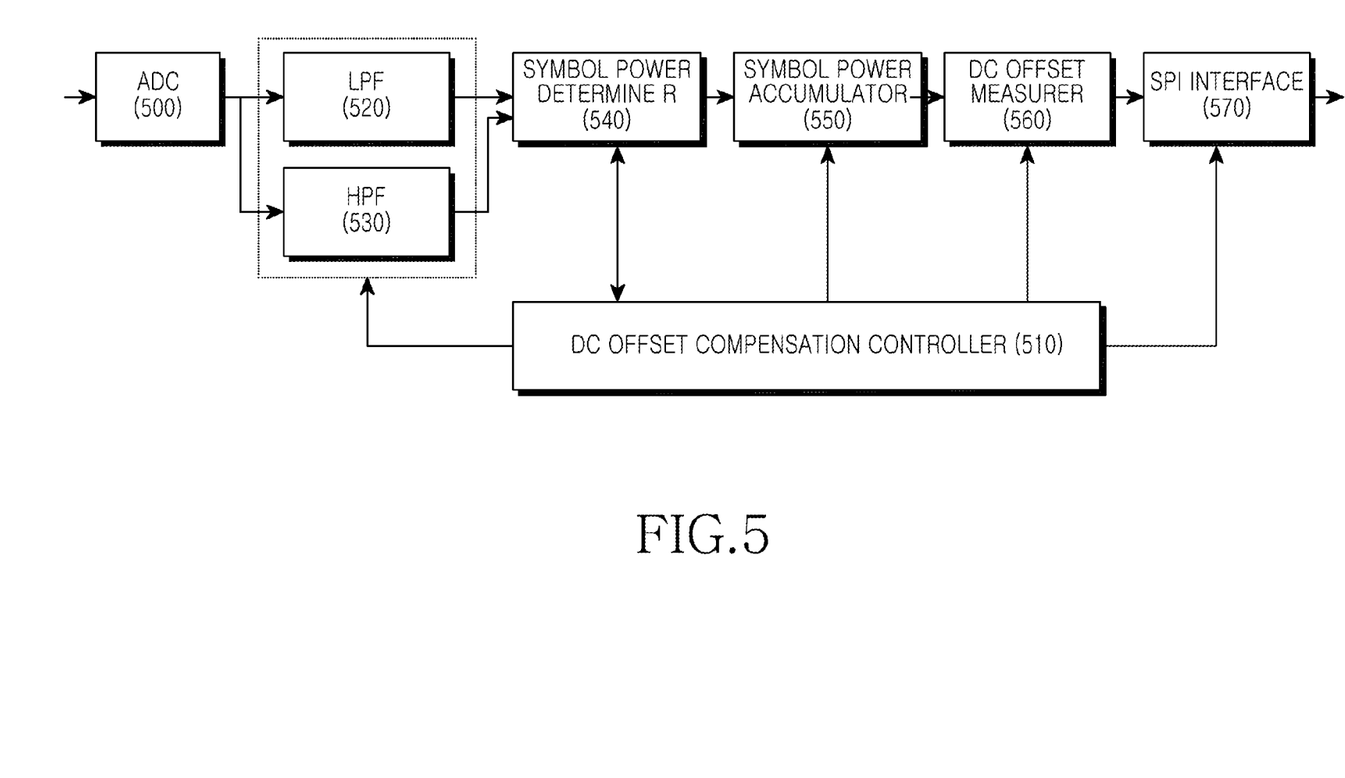
FIG. 5 is a block diagram of a receiving terminal for removing a DC offset according to an exemplary embodiment of the present invention.

FIG. 5 is a block diagram of a receiving terminal for removing a DC offset according to an exemplary embodiment of the present invention.

Referring to FIG. 5, in order to remove a DC offset, the receiving terminal includes an Analog-to-Digital Converter (ADC) 500, a DC offset compensation controller 510, an LPF 520, an HPF 530, a symbol power determiner 540, a symbol power accumulator 550, a DC offset measurer 560, and an SPI interface 570.

The ADC 500 converts an analog signal, received from an RF receiver, into a digital signal.

The DC offset compensation controller 510 controls the symbol power determiner 540, the symbol power accumulator 550, the DC offset measurer 560 and the SPI interface 570 to compensate the DC offset by using a data-unmapped symbol interval.

Also, the DC offset compensation controller 510 controls the symbol power determiner 540, the symbol power accumulator 550, the DC offset measurer 560 and the SPI interface 570 to compensate the DC offset during a TTG interval by accumulating the received signal power of data-mapped symbols.

Furthermore, the DC offset compensation controller 510 considers the received signal power when determining whether to compensate the DC offset by using the HPF 530. For example, if the received signal power is smaller than a reference value, the DC offset compensation controller 510 determines to compensate the DC offset by using the HPF 530. In this case, if the DC offset value of a signal with a DC offset component removed through the HPF 530 is smaller than a reference value, the DC offset compensation controller 510 uses the HPF 530 to compensate the DC offset of the RFIC. On the other hand, if the DC offset value of the signal with a DC offset component removed through the HPF 530 is greater than the reference value, the DC offset compensation controller 510 recognizes that the DC offset cannot be compensated through the HPF 530. In this case, the DC offset compensation controller 510 compensates the DC offset of the RFIC by the difference between the DC offset value of the signal with a DC offset component removed through the HPF 530 and the DC offset value of the signal passing through the LPF 520.

The LPF 520 passes only signals with a frequency band lower than a reference frequency band.

The HPF 530 passes only signals with a frequency band higher than a reference frequency band. Accordingly, the HPF 530 can remove the DC offset component of a received signal. Herein, the reference frequency band of the LPF 520 may be identical to or different from the reference frequency band of the HPF 530.

Also, under the control of the DC offset compensation controller 510, the HPF 530 operates only when the received signal power is greater than the reference value.

The symbol power determiner 540 determines the power of the received signal under the control of the DC offset compensation controller 510.

Under the control of the DC offset compensation controller 510, the symbol power accumulator 550 accumulates the received signal power of data-mapped symbols.

Under the control of the DC offset compensation controller 510, the DC offset measurer 560 measures the DC offset by using the received signal power determined by the symbol power determiner 540 or the received signal power information accumulated by the symbol power accumulator 550. For example, the DC offset measurer 560 determines the average of the DC offset during a data-unmapped symbol interval. Herein, the average of the DC offset is the average of DC offsets determined through data-mapped symbols before the data-unmapped symbol interval.

Also, under the control of the DC offset compensation controller 510, the DC offset measurer 560 determines the DC offset value of a signal passing through the HPF 530 and the DC offset value of a signal passing through the LPF 520.

Under the control of the DC offset compensation controller 510, the SPI interface 570 controls the RFIC to compensate the DC offset.

In the above-described exemplary embodiment, the DC offset compensation controller 510 turns on/off the HPF 530 according to the received signal power.

In another exemplary embodiment, the HPF 530 is always turned on. Herein, the DC offset compensation controller 510 may locate a switch at the ADC 500 and the HPF 530 to restrict the input of the received signal into the HPF 530 according to the received signal power.

As described above, exemplary embodiments of the present invention remove the DC offset at the receiving terminal by using the data-unmapped DL time resources in the wireless communication system, thereby making it possible to remove the DC offset by measuring an accurate DC offset even in the event of a sudden DC offset change. Also, the receiving terminal uses the HPF adaptively according to the received signal power, thereby making it possible to remove a large DC offset.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a terminal in a wireless communication system, the method comprising:
   receiving resource allocation information in a downlink frame;
   identifying at least one data-unmapped interval within the downlink frame based on the resource allocation information;
   estimating a direct current (DC) offset during the at least one data-unmapped interval; and
   compensating the DC offset during the downlink frame,
   wherein the compensating of the DC offset comprises compensating the DC offset by using a high-pass filter (HPF) and a low-pass filter (LPF).

2. The method of claim 1, wherein the compensating of the DC offset comprises compensating the DC offset on a time resource block basis.

3. The method of claim 1, wherein the estimating of the DC offset comprises determining an average value of the DC offset of at least one signal received during the part of the downlink frame.

4. The method of claim 2, wherein the time resource block comprises at least one of a symbol and a subset of the downlink frame.

5. The method of claim 1, wherein the compensating of the DC offset comprises:
   estimating a first DC offset value of a signal passing through the HPF, and
   compensating the DC offset by using the HPF, if the first DC offset value is smaller than a reference value.

6. The method of claim 5, wherein the compensating of the DC offset further comprises:
   if the first DC offset value is equal to or greater than the reference value,
      determining a difference value between the first DC offset value and a second DC offset value of a signal passing the LPF, and
      compensating the DC offset by using the difference value.

7. A method for operating a terminal in a wireless communication system, the method comprising:
   receiving resource allocation information in a downlink frame;
   identifying at least one data-unmapped interval within the downlink frame based on the resource allocation information;
   estimating a direct current (DC) offset during the at least one data-unmapped interval; and
   compensating the DC offset during the downlink frame,
   wherein the compensating of the DC offset comprises, compensating the DC offset by using a low-pass filter (LPF), if a power of a signal received through the at least one interval is equal to or greater than a reference power.

8. An apparatus for a terminal in a wireless communication system, the apparatus comprising:
   a receiver configured to receive resource allocation information in a downlink frame; and
   a controller configured to:
      identify at least one data-unmapped interval within the downlink frame based on the resource allocation information,
      estimate a direct current (DC) offset during the at least one data-unmapped interval, and
      compensate the DC offset during the downlink frame,
      wherein the controller is configured to compensate the DC offset by using a high-pass filter (HPF) and a low-pass filter (LPF).

9. The apparatus of claim 8, wherein the controller is configured to determine an average value of the DC offset of at least one signal received during the part of the downlink frame.

10. The apparatus of claim 8, wherein the controller is configured to compensate the DC offset on a time resource block basis by using the DC offset average value.

11. The apparatus of claim 10, wherein the time resource block comprises at least one of a symbol and a subset of the downlink frame.

12. The apparatus of claim 8, wherein, if a first DC offset value of a signal passing through the HPF is smaller than a reference value, the controller is configured to compensate the DC offset by using the HPF.

13. The apparatus of claim 12, wherein, if the first DC offset value is equal to or greater than a reference value, the controller is configured to compensate the DC offset by using a difference value between the first DC offset value and a second DC offset value of a signal passing the LPF.

14. An apparatus for a terminal in a wireless communication system, the apparatus comprising:

a receiver configured to receive resource allocation information in a downlink frame; and
a controller configured to:
identify at least one data-unmapped interval within the downlink frame based on the resource allocation information,
estimate a direct current (DC) offset during the at least one data-unmapped interval, and
compensate the DC offset during the downlink frame,
wherein the controller is configured to compensate the DC offset by using a low-pass filter (LPF), if a power of a signal received through the at least one interval is equal to or greater than a reference power.

* * * * *